Figure 14:
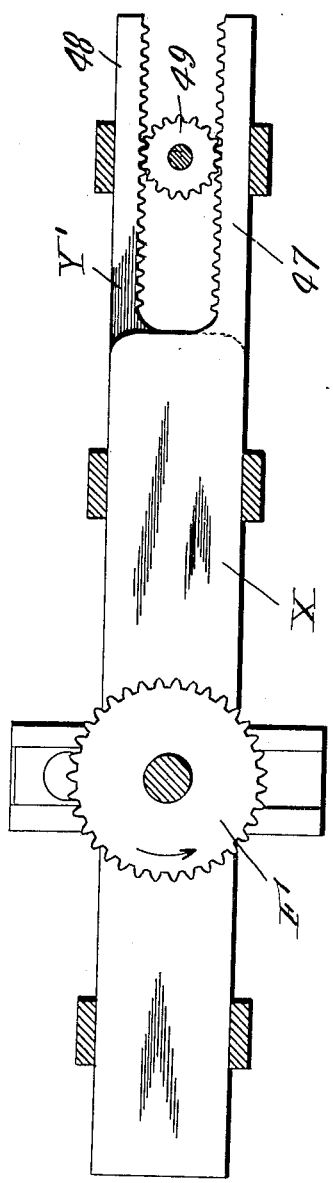

No. 878,532. PATENTED FEB. 11, 1908.
R. T. JOHNSTON.
MECHANICAL MOVEMENT.
APPLICATION FILED MAR. 30, 1904. RENEWED JUNE 15, 1907.
6 SHEETS—SHEET 1.
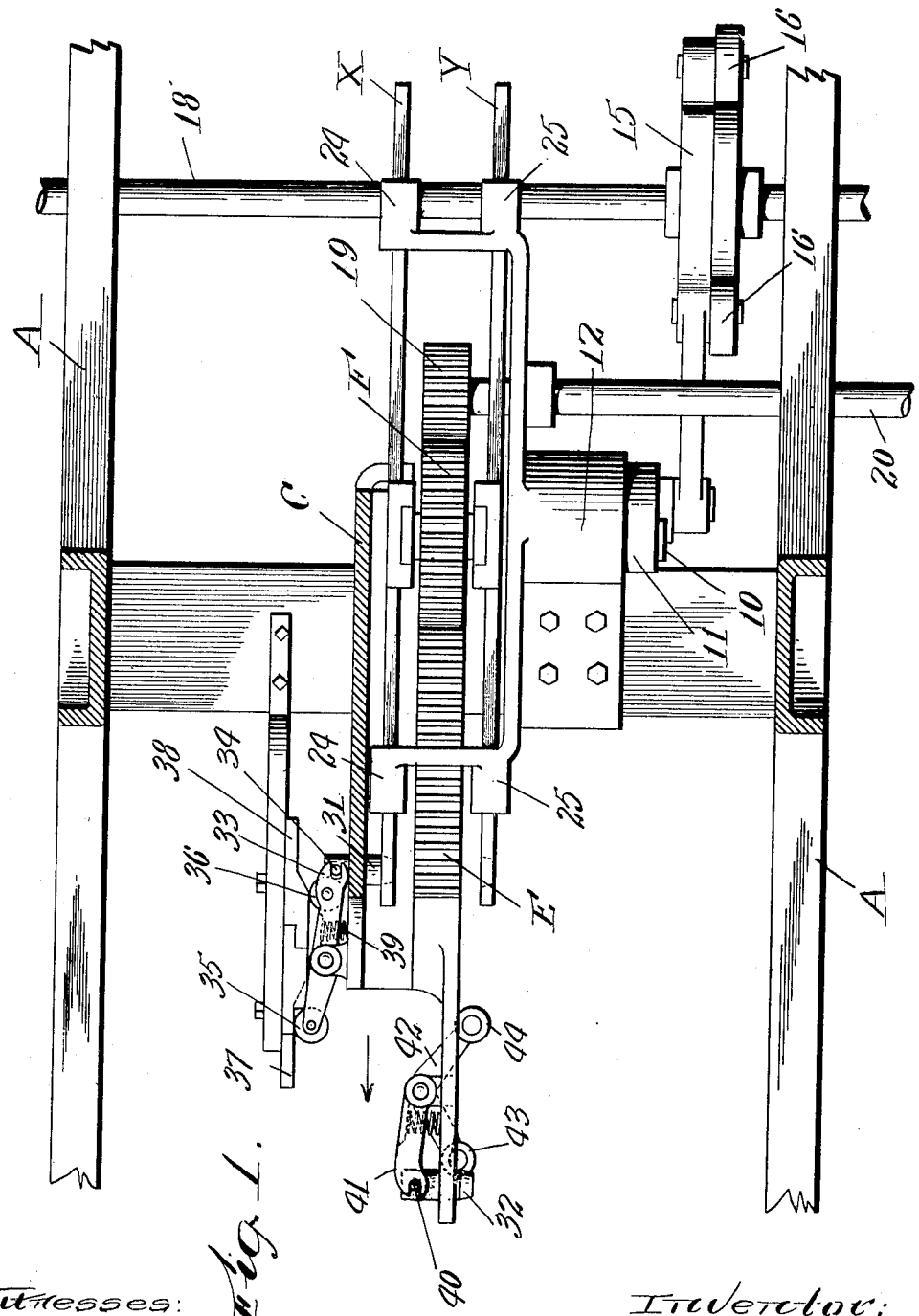

No. 878,532. PATENTED FEB. 11, 1908.
R. T. JOHNSTON.
MECHANICAL MOVEMENT.
APPLICATION FILED MAR. 30, 1904. RENEWED JUNE 15, 1907.
6 SHEETS—SHEET 2.
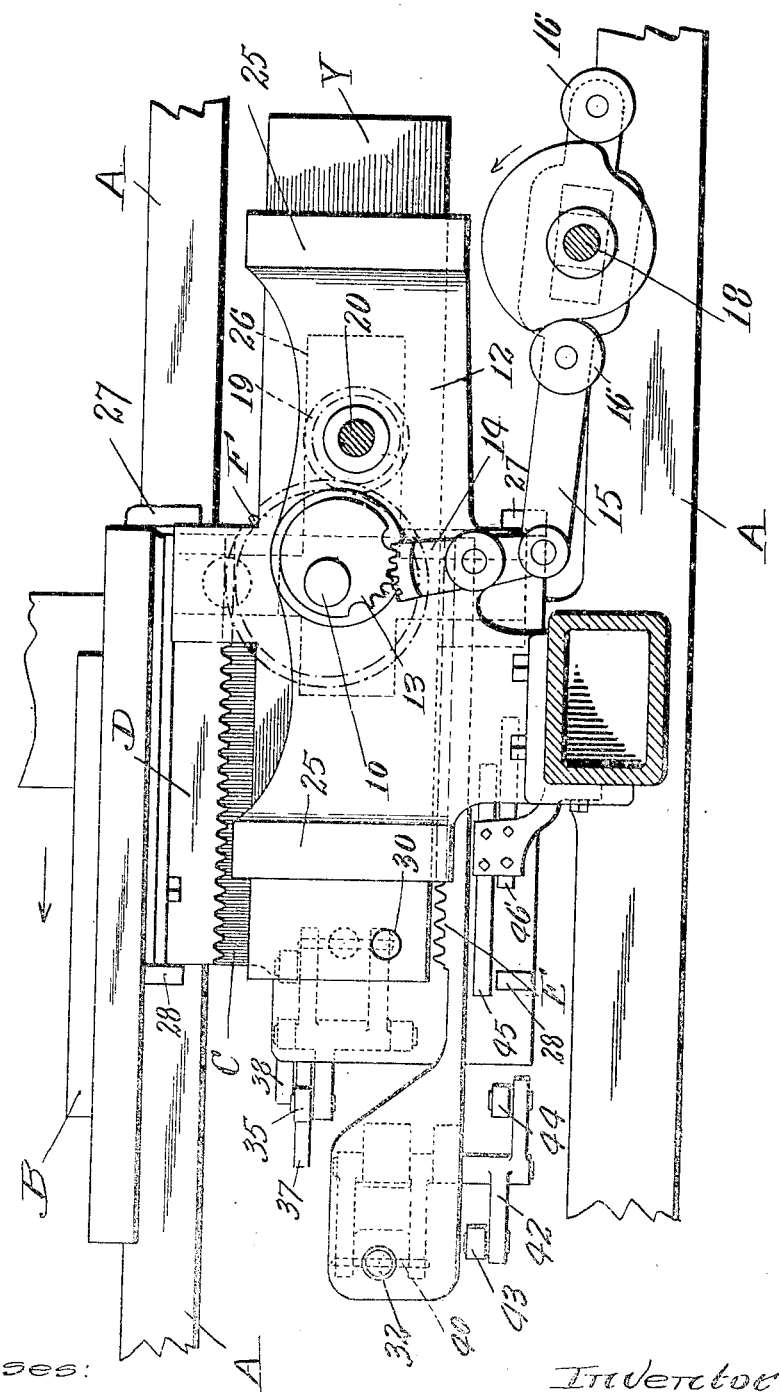

No. 878,532.  
PATENTED FEB. 11, 1908.  
R. T. JOHNSTON.  
MECHANICAL MOVEMENT.  
APPLICATION FILED MAR. 30, 1904. RENEWED JUNE 15, 1907.
6 SHEETS—SHEET 3.
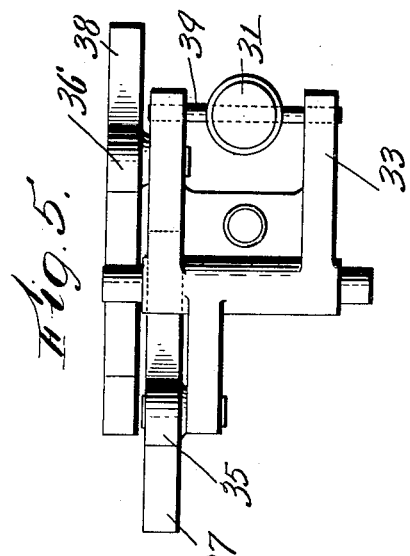
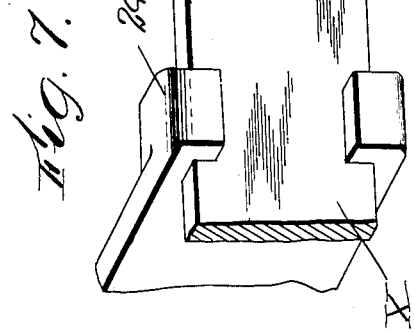
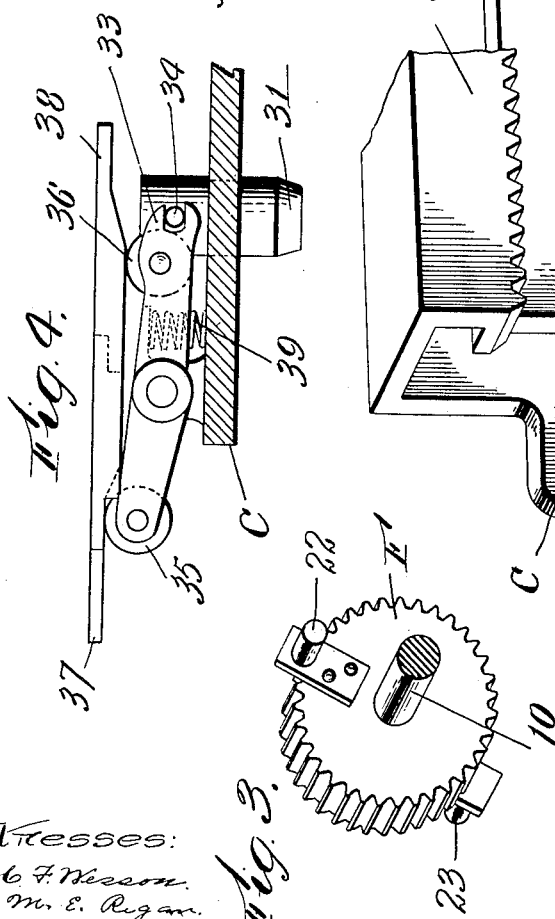
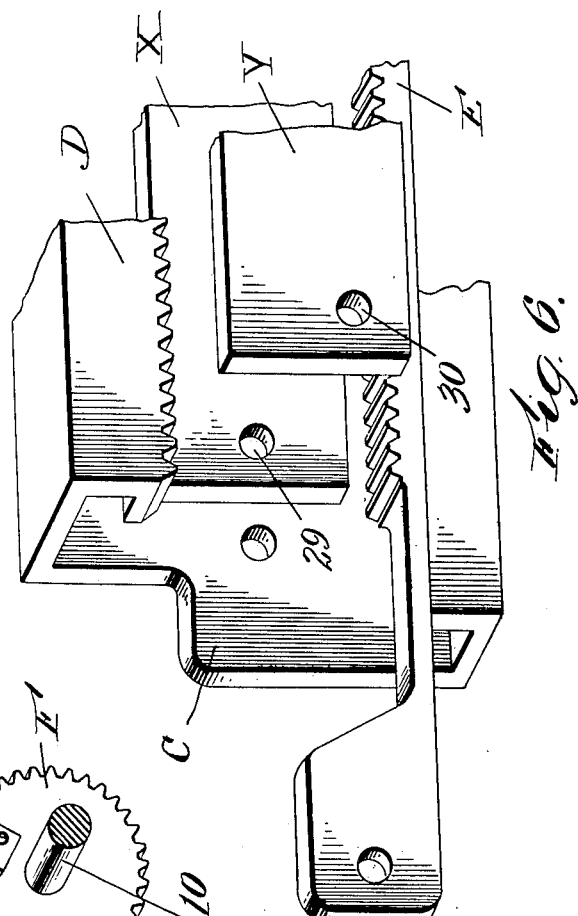
Witnesses:  
C. F. Wesson  
M. E. Regan
Inventor:  
R. T. Johnston  
By his Attorneys  
Southgate & Southgate

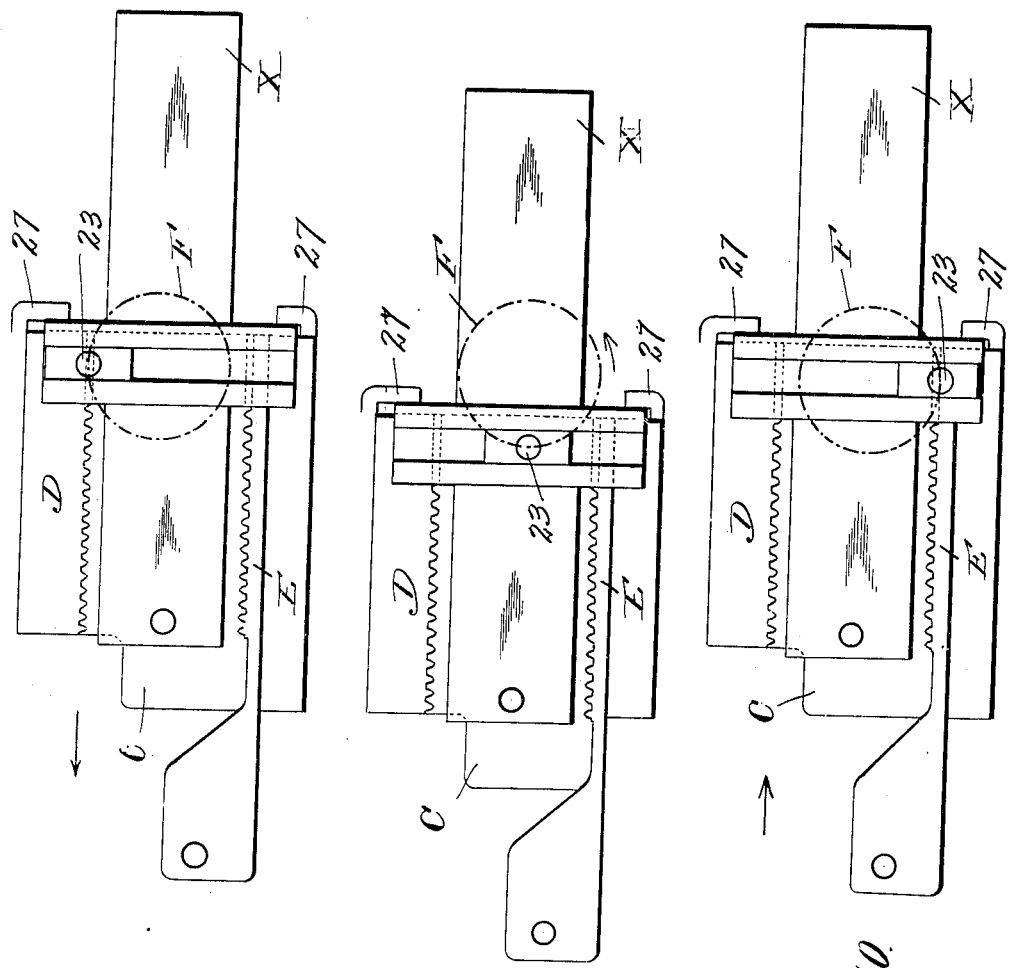

No. 878,532.
R. T. JOHNSTON.
MECHANICAL MOVEMENT.
APPLICATION FILED MAR. 30, 1904. RENEWED JUNE 15, 1907.
PATENTED FEB. 11, 1908.
6 SHEETS—SHEET 5.
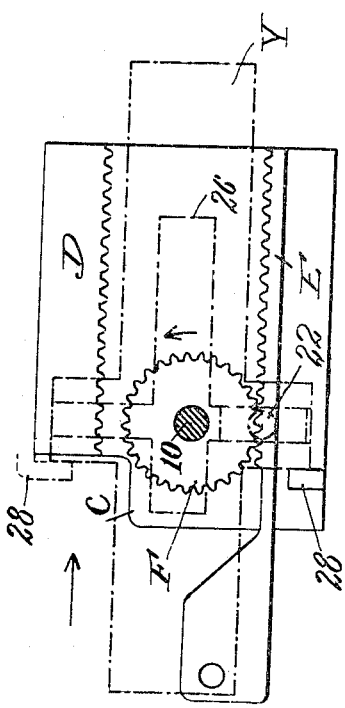
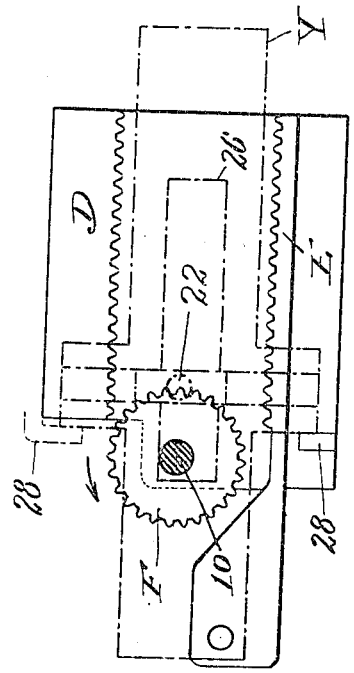
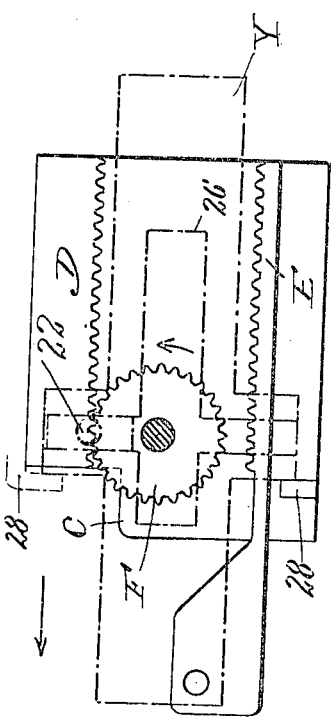
Witnesses:
C. F. Nisson
M. E. Regan
Inventor:
R. T. Johnston
By his Attorneys
Luthgate & Luthgate No. 878,532.  
PATENTED FEB. 11, 1908.  
R. T. JOHNSTON.  
MECHANICAL MOVEMENT.  
APPLICATION FILED MAR. 30, 1904. RENEWED JUNE 15, 1907.  
6 SHEETS—SHEET 6.

Witnesses:  
Inventor:  
R. T. Johnston  
By his Attorneys

UNITED STATES PATENT OFFICE.

ROBERT T. JOHNSTON, OF PLAINFIELD, NEW JERSEY, ASSIGNOR TO THE CAMPBELL PRINTING PRESS & MANUFACTURING COMPANY, OF NEW YORK, N. Y., A CORPORATION OF NEW YORK.

MECHANICAL MOVEMENT.

No. 878,532.      Specification of Letters Patent.      Patented Feb. 11, 1908.

Application filed March 30, 1904. Serial No. 200,745. Renewed June 15, 1907. Serial No. 379,179.

*To all whom it may concern:*

Be it known that I, ROBERT T. JOHNSTON, a citizen of the United States, residing at Plainfield, in the county of Union and State of New Jersey, have invented a new and useful Mechanical Movement, of which the following is a specification.

In Letters Patent No. 570,597 granted November 3, 1896 in the name of W. S. Huson, is shown, described and claimed a mechanical movement especially adapted for printing presses which comprises a main driving mechanism and a crank actuated reversing mechanism consisting of a controlling member periodically connected to the bed to accomplish the reversal thereof. This member specifically consists of a crank-actuated yoke and latches for connecting the yoke to the bed.

In an application for patent filed by me May 17, 1900, Serial No. 16,973, I have shown, described and claimed a modified or improved form of such mechanism employing sliding bolts instead of latches. The advantages of said constructions are set out at length in said patent and in said application and need not be herein recapitulated. In said devices the driving gear has an odd number of revolutions for each reciprocation of the bed. That is to say, the driving pinion makes one or more complete revolutions for each constant speed movement of the bed and a half revolution for each reversal thereof.

The object of this present improvement is to rearrange and adapt said mechanism so that the driving pinion may make an even number of revolutions for each complete reciprocation of the bed, and primarily so that it may make two revolutions therefor. By this arrangement, the driving pinion may make a half revolution for each part of the constant speed movement of the bed and a half revolution for each reversal thereof. This gives, relatively speaking, more time and travel to the reversal movement of the bed which is advantageous in some forms of bed movements, particularly in the larger sized printing presses. The modification by which I obtain this desirable result consists in using two independently moving members and in operating the same oppositely; preferably by two oppositely disposed crank pins carried by the driving pinion.

Figure 15:
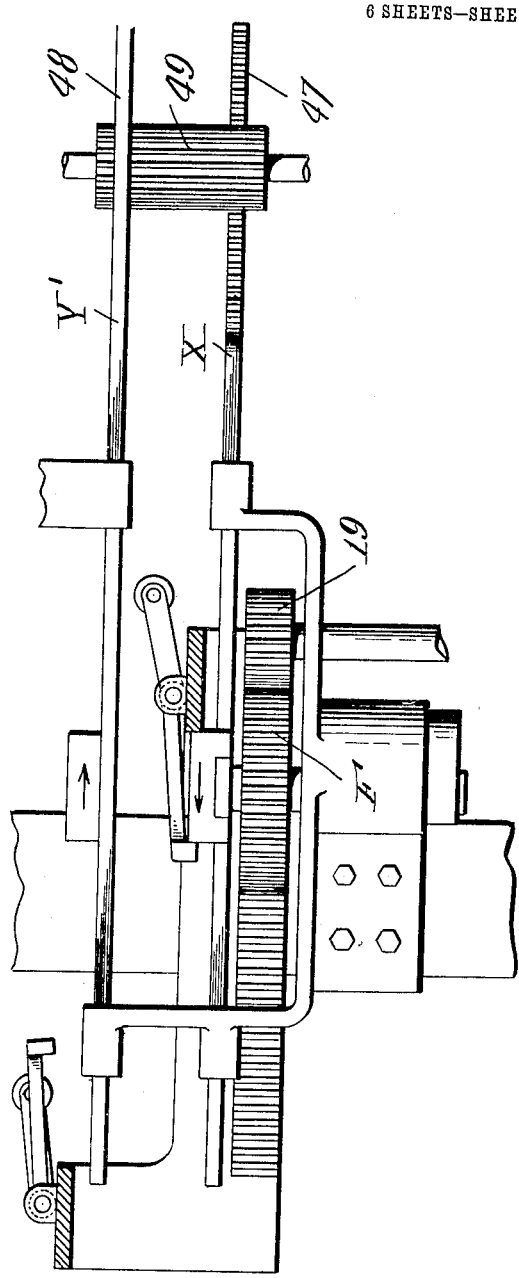

The movement is illustrated in one form in the accompanying five sheets of drawings, referring to which, Figure 1 is a sectional plan elevation illustrating the movement. Fig. 2 is a sectional elevation thereof. Fig. 3 is a perspective view of the driving pinion. Figs. 4 and 5 are a sectional plan view and an elevation on an enlarged scale illustrating the construction of one of the sliding bolts and its operating mechanism. Fig. 6 is a perspective view illustrating the relative arrangement of racks and yokes. Fig. 7 is a perspective view illustrating the construction of one of the guides which carries the yokes, Figs. 8 to 13 inclusive are diagrammatic views on a reduced scale illustrating the operation of the device, and Figs. 14 and 15 are a sectional elevation and a plan view respectively of a modification.

The improvement can be best understood by describing the mechanism in detail.

Referring to the drawings, A designates the frame-work of the machine upon which the bed or reciprocating member B is mounted or fitted. Depending from the bed is a rack hanger C which carries oppositely disposed and facing racks D and E. The driving pinion F is disposed between these racks so as to engage each alternately. The driving pinion is mounted upon a shaft 10 journaled in an eccentric bushing 11, which latter is journaled in a bearing 12 bolted to the frame-work. On the end of the eccentric bushing is fitted a collar 13 which has gear teeth which are engaged by gear teeth formed on the end of a pivoted lever 14. This latter is operated from a yoke 15 having rolls 16—16 engaging a cam mounted on a shaft 18. The driving pinion, in the particular instance under consideration, is geared to turn twice for each revolution of the cam shaft 18. By this arrangement the driving pinion will be raised and lowered to engage each of the racks D and E alternately.

The driving pinion is driven by a smaller pinion 19 arranged on a driving shaft 20. Secured on the front and rear side faces of the driving pinion F are pieces which carry crank pins 22 and 23. These crank-pins are oppositely disposed or set at 180 degrees to each other and on each crank pin is journaled a rectangular block. A slotted yoke X is fitted to slide in bearings 24 projecting from the bearing 12. A second yoke Y is also fitted to slide in bearings 25 projecting from the bearings which support the previously named bearings. The yoke Y is disposed between the driving pinion F and the bearing 12, the shaft 10 projecting to carry the driving pinion F a sufficient distance outwardly from the eccentric bushing 11 for this purpose. Said yoke has a horizontal slot 26 cut therein so that the shafts 10 and 20 will not interfere with its reciprocating movement.

Abutments 27 project from the bed and rack-hanger to engage the right hand side of the vertical part of the yoke X as shown in the drawings, and similar abutments 28 project from the bed and rack-hanger to engage the left hand side of the vertical part of the yoke Y. The abutments 27—27 come against the yoke or slider and take the principle strain of the left-hand reverse and the abutments 28—28 come up against the yoke and take the principle part of the strain of the right-hand reverse. A hole 29 is bored in the left hand end of the horizontal part of the yoke X and a hole 30 is bored in the left hand horizontal part of the yoke Y. A sliding bolt 31 is carried by the rack-hanger to lock the yoke X to the bed and a similar bolt 32 is carried by the rack-hanger to lock the yoke Y to the bed. The sliding bolt 31 is operated by a pronged lever 33 which engages a pin 34 secured in said bolt; also formed integrally with the hub of said pronged lever is a projecting arm and on this projecting arm and the top arm of said pronged lever are arranged cam-rollers 35 and 36 which are positioned to engage cams 37 and 38 carried by the framing. A spring 39 keeps the bolt normally retracted. By this arrangement, the bolt 31 will be operated to lock the yoke X to the bed at the proper time.

The bolt 32 has a pin 40 therethrough engaging which is a pronged lever 41 mounted on a shaft which carries a two-armed lever 42 which carries rolls 43 and 44 which engage cams 45 and 46 carried by the frame. By this arrangement, the yoke Y will be connected to the bed at the proper time.

The operation can be followed from the diagrams.

The racks D and E should be made one-half the pitch circumference of the driving pinion F if a two revolution driving pinion is to be employed. In practice and as shown, the racks are generally made a few teeth longer and these teeth in each direction are filed off so as not to interfere with the beginning or completion of the reversing movement, so that there will be an easy disengagement and engagement of the driving pinion with the racks.

In Fig. 8, the bed is supposed to have just completed its constant speed movement to the left with the driving pinion F in engagement with and just leaving the rack D. This movement is usually the printing movement of the bed as it is usually better to have the driving pinion engage the top rack for this purpose. The yoke X has just been locked to the bed. During the next quarter revolution of the driving pinion E, the bed will be gradually brought from full speed to a state of rest at its left hand extreme, as shown in Fig. 9. During the next quarter revolution of the driving pinion F, the bed will be gradually started from zero up to full speed and the parts brought to the position shown in Fig. 9. Thus, the last referred to half-revolution of the pinion will give the bed its left hand reversing movement by the action of the yoke X. During the reversing movement the driving pinion will lower to engage the rack E, this slight lowering of the pinion usually taking place between the positions shown in Figs. 8 and 9, although it may take place at any time between the positions shown in Figs. 8 and 10. Now, as the driving pinion makes its half-revolution in engagement with the lower rack E the bed will be given its constant speed movement to the right. This will bring the parts to the position shown in Fig. 11, when the yoke Y will be locked to the bed. During the next quarter revolution of the driving pinion the bed will be gradually brought from full speed to a state of rest at its right hand extreme as shown in Fig. 12. During the next quarter revolution of the driving pinion the bed will be gradually started from zero up to full speed and the parts brought to the position shown in Fig. 13. Thus, during this last half-revolution of the driving pinion the bed will be reversed at its right hand extreme. During this reversing movement of the bed the driving pinion is raised so as to engage with the rack D. During the next half-revolution of the driving pinion the bed will be given its main or constant speed movement to the left. Thus, the movement of the bed is one-half pitch circumference of the driving pinion plus two pitch radii thereof or is one-half a pitch circumference of said driving pinion plus the pitch diameter thereof. The reversals at either end of the movement are, of course, the desirable crank reversals taking a half turn of the wrist pins and moving the bed through a radius of the wrist pin. By this construction, a device is provided which has the advantages hereinbefore pointed out.

Referring to the movement shown in Figs. 14 and 15, it will be seen that the yoke X is arranged substantially as shown in said patent to Huson. This yoke is provided with an extending rack 47. The yoke Y' in this modification becomes simply an independently moving member and does not have to be slotted. This member Y' is provided with a rack 48. The racks 47 and 48 are oppositely disposed and motion is communicated from rack 47 to rack 48 by a wide faced pinion 49 which may be journaled in suitable bearings in the frame-work. By this connection the independently moving controlling members X and Y' are moved oppositely to operate as do the yokes X and Y previously described. In other words, in the first described device the relatively opposite movement of the independently controlling members is obtained by two oppositely disposed crank-pins, while in the present modification the change of movement is obtained by using a single crank-pin, driving one member directly therefrom and by driving the other member therefrom through gearing which changes the direction of movement thereof. The members X and Y' in the last described modification are locked to the bed by the latching mechanism shown in said Huson patent.

The device herein shown may be varied by a skilled mechanic without departing from the scope of my invention as expressed in the claims.

Having thus fully described my invention, what I claim and desire to secure by Letters Patent is:—

1. In a mechanical movement, the combination of a reciprocating bed or member, two controlling members periodically connected to the bed, and means for imparting a relatively opposite to-and-fro reversing motion to said two-controlling members.

2. In a mechanical movement, the combination of a reciprocating bed or member, mechanism for imparting the main movement thereto, and a reversing mechanism consisting of two oppositely moving rotating crank actuated controlling members periodically connected to the bed to reverse the movement thereof.

3. In a mechanical movement, the combination of a reciprocating bed or member, a driving mechanism therefor, two controlling members adapted to be periodically connected to the bed to reverse the same, and two oppositely disposed rotating cranks connected to actuate said controlling members.

4. In a mechanical movement, the combination of a reciprocating bed or member, a mechanism for imparting the main movement thereto, and a reversing mechanism consisting of two yokes, oppositely disposed cranks for actuating said yokes, and means for locking said yokes to the bed so that one yoke will reverse the movement of the bed in one direction and the other yoke will reverse the movement of the bed in the other direction.

5. In a mechanical movement, the combination of the bed, two racks carried thereby, a driving pinion, two oppositely disposed crank or wrist pins carried by said driving pinion, two yokes actuated from said oppositely disposed wrist pins, and means for connecting said yokes to the bed.

6. In a mechanical movement, the combination of a reciprocating bed or member carrying racks, a driving pinion, oppositely disposed wrist pins carried by said driving pinion on the opposite faces thereof, two yokes operated by said wrist pins, and means for locking the yokes to the bed.

7. In a mechanical movement, the combination of a reciprocating bed or member carrying racks, a driving pinion carrying oppositely disposed crank pins on the opposite faces thereof, two yokes operated from said wrist pins and disposed on opposite sides of said driving pinion, one of said yokes having a slot through which the shaft of the driving pinion projects, and means for locking the yokes to the bed.

In testimony whereof I have hereunto set my hand, in the presence of two subscribing witnesses.

ROBERT T. JOHNSTON.

Witnesses:
D. W. JONES,
A. E. VAN CAMPAIN.